United States Patent [19]

Hahn et al.

[11] Patent Number: 4,592,701

[45] Date of Patent: Jun. 3, 1986

[54] ROTOR BLADE, ESPECIALLY FOR A ROTARY WING AIRCRAFT

[75] Inventors: Michael Hahn, Ottobrunn; Otmar Friedberger, Neubiberg; Gerhard Singer, Munich, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 686,472

[22] Filed: Dec. 26, 1984

[30] Foreign Application Priority Data

Jan. 19, 1984 [DE] Fed. Rep. of Germany ....... 3401737

[51] Int. Cl.$^4$ ............................................. B64C 27/33
[52] U.S. Cl. .................................. 416/134 A; 416/138; 416/141; 416/61; 416/239
[58] Field of Search ............... 416/134 A, 138 A, 141, 416/61, 239

[56] References Cited

U.S. PATENT DOCUMENTS

| 4,111,605 | 9/1978 | Roman et al. | 416/141 |
| 4,252,503 | 2/1981 | Wackerle et al. | 416/141 |
| 4,266,912 | 5/1981 | Roman | 416/141 |
| 4,345,876 | 8/1982 | Schwarz et al. | 416/134 A |
| 4,381,902 | 5/1983 | Head et al. | 416/134 A |
| 4,427,340 | 1/1984 | Metzger et al. | 416/141 |

FOREIGN PATENT DOCUMENTS

| EP85129 | 8/1983 | European Pat. Off. | 416/134 A |
| 521317 | 11/1931 | Fed. Rep. of Germany | 416/61 |

Primary Examiner—Everette A. Powell, Jr.
Attorney, Agent, or Firm—W. G. Fasse; D. H. Kane, Jr.

[57] ABSTRACT

A rotor blade, for example for a rotary wing aircraft, has a wing section and a root section interconnected by a neck section surrounded by a blade angle adjustment sleeve which is stiff against torque moments for transmitting blade angle adjustment movements through the sleeve to the wing section. The trailing edge of the sleeve is provided with a gap which extends, at least partially, alongside the rear edge of the neck section for visually inspecting the neck section inside the sleeve even when the root section is connected to a rotor hub. A reflecting mirror may be used for inspecting all sides of the neck section through the gap.

5 Claims, 2 Drawing Figures

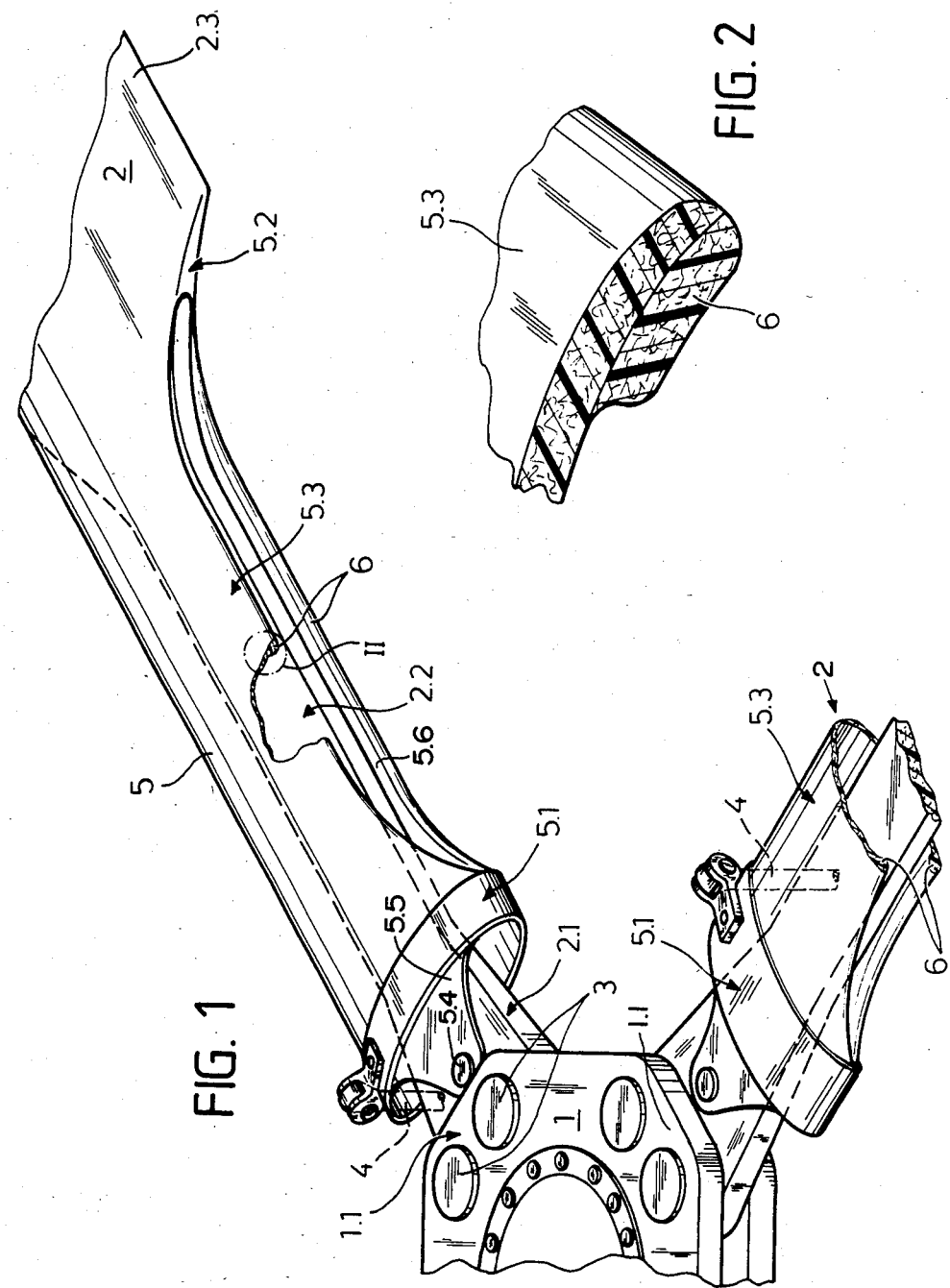

ROTOR BLADE, ESPECIALLY FOR A ROTARY WING AIRCRAFT

FIELD OF THE INVENTION

The invention relates to a rotor, especially a rotor blade for a rotary wing aircraft such as a helicopter.

DESCRIPTION OF THE PRIOR ART

Many different modifications of rotor blades for the rotor of a rotary wing aircraft are knowon in the art. Generally, such rotors comprise one or several radially outwardly extending rotor blades which are connected to the arms of a rotor hub. Each blade comprises a blade wing section connected to a blade root section through a torsionally yielding blade neck section. The neck section needs to be torsionally yielding to permit the blade angle adjustments which are accomplished with the aid of blade angle adjustment means which, for example, comprise a bridging sleeve which conventionally surounds the flexible blade neck section in a torsion stiff manner so that torque moments may be transmitted through the sleeve from adjustment members located near the rotor hub to the blade wing section proper. For this purpose the sleeve is rigidly connected to the radially inner end of the blade wing section with the radially outer end of the sleeve. The radially inner end of the sleeve is flexibly or pivotally connected to the blade root.

Since the blade angle adjustment sleeve surrounds the blade neck section substantially completely, it is not possible to visually inspect the blade neck section during maintenance work or the like. Such inspections are necessary on a repeated basis for safety purposes.

OBJECTS OF THE INVENTION

In view of the above it is the aim of the invention to achieve the following objects singly or in combination:

to provide a torque transmitting blade angle adjustment sleeve for the rotor blade for a rotary wing aircraft which permits a visual inspection of the blade neck section;

to integrate the structure of the blade angle adjustment sleeve into the blade structure; and to substantially reduce the technological efforts and expenditures required for manufacturing such blades.

SUMMARY OF THE INVENTION

The blade according to the invention is characterized in that its blade angle adjustment torsion stiff sleeve is provided along its trailing edge with a gap which extends longitudinally intermediate the radially inner end of the blade wing section and the blade root section. The length of the open gap along the trailing edge of the sleeve will depend on the particular type of blade. Since the gap extends alongside or in parallel to the rear or trailing edge of the blade neck section, the visual inspection of the blade neck section is greatly facilitated.

This type of structure for the blade angle adjusting sleeve does not increase the aerodynamic drag of the rotor blade. Additionally, the sleeve can be manufactured as an integral component of the blade wing section, especially where both, the sleeve and the blade wing section, are made of fiber-reinforced composite synthetic materials.

Any reduction in the torsional stiffness or torque transmitting ability of the sleeve is efficiently compensated by reinforcing the gap forming edges along the trailing edge of the sleeve, whereby, where the sleeve is made of fiber composite material, the reinforcing fiber strands extend alongside the edges in a unidirectional manner substantially in parallel to the longitudinal, radial axis of the respective blade.

BRIEF FIGURE DESCRIPTION

In order that the invention may be clearly understood, it will now be described, by way of example, with reference to the accompanying drawings, wherein:

FIG. 1 is a perspective view of a rotor hub for a rotary wing aircraft provided with, for example, four rotor blades, only two of which are shown in a partially broken-away manner; and FIG. 2 shows on an enlarged scale a portion of the blade angle adjustment sleeve encircled by a dash-dotted line II in FIG. 1.

DETAILED DESCRIPTION OF A PREFERRED EXAMPLE EMBODIMENT AND OF THE BEST MODE OF THE INVENTION

FIG. 1 shows a rotor hub 1 having, for example, four rotor hub arms 1.1, two of which are shown. One rotor blade 2 is connected to each of these rotor hub arms 1.1. The rotor blades 2 are, for example, made of fiber composite material comprising glass fibers or carbon fibers, or other synthetic fibers suitable for the purpose embedded in a synthetic resin. The arms 1.1 and the respective blades 2 extend radially outwardly from the central rotational axis of the rotor hub 1. Each blade 2 comprises a blade root section 2.1, a blade neck section 2.2 and a blade wing section 2.3. The blade root is rigidly connected to the respective arm 1.1 by two bolts 3 as is conventional. Therefore, and since the blade neck section 2.2 is yielding relative to torque moments it is necessary to provide blade angle adjustment means. In order to make the blade neck section 2.2 relatively yielding to torsion loads, it is preferably constructed of fiber strands having a unidirectional orientation in the longitudinal direction of the blade 2, that is, in the radial direction. The blade angle adjustment of the blade wing section 2 is accomplished by blade angle control sleeve 5 which is stiff against torsion and substantially encloses the blade neck section 2.2. The sleeve 5 is maintained out of contact with the blade neck section 2.2 along its length, except that the radially outer end of the angle control sleeve 5 is rigidly connected to the blade wing section 2.3 by first connecting means 5.2, which may comprise an integral fiber-reinforced synthetic material construction of the blade wing section 2.3 and the sleeve 5. The first connecting means 5.2 makes sure that the radially outer end of the torsion stiff sleeve 5 is circumferentially uninterrupted. By arranging the reinforcing fibers in the sleeve 5 in a ±45° orientation relative to the longitudinal blade axis, a high torsional stiffness or rigidity may be achieved while simultaneously making the sleeve 5 relatively flexible with regard to bending loads. By making the sleeve 5 relatively flexible to bending loads it is possible to avoid a transmission or feedback of deflections of the blade neck section 2.2 into the sleeve 5, thereby avoiding an interference of such deflections with the blade angle adjustment function of the sleeve 5.

The radially inner end of the sleeve 5 is provided with a reinforcing member 5.1 which is also circumferentially uninterrupted and connected to a blade angle control rod 4 of conventional construction. By moving the rod 4 up or down, the blade angle may be adjusted. Additionally, the radially inner end of the sleeve 5 is pivotally or flexibly connected through a pivot member 5.4 and a sleeve extension 5.5 to the blade root 2.1. The pivoting or flexing members 5.4, 5.5 constitute the second connecting means.

Incidentally, the sleeve 5 and the blade wing section 2.3 or at least the skin of the blade wing section 2.3 can form a single piece integral body by laminating the respective fiber composite material in a single opertion to form the sleeve 5 and the blade wing section 2.3 simultaneously.

In order to permit the inspection of the blade neck section 2.2 even when the latter is connected through the blade root 2.1 to the rotor hub, the sleeve 5 is provided in its middle section 5.3 along its trailing edge opposite the leading edge with an inspection gap 5.6. The length of the gap 5.6 which extends substantially in parallel to the rear edge of the blade neck section 2.2, will be selected in accordance with the particular blade type and may extend from the first connecting means 5.2 to the reinforcing member 5.1.

In order to compensate any reduction in the torsional stiffness of the intermediate sleeve section 5.3, the edges which form the gap 5.6 are provided with a reinforcement 6 extending alongside each gap edge and so that both reinforcements 6 preferably face each other across the gap 5.6. Preferably, the reinforcing fibers in the edge reinforcements 6 extend unidirectionally in parallel or substantially in parallel to the longitudinal blade axis. If desired, the connecting and reinforcing members 5.1, 5.2 may also be reinforced, for example a rib, not shown, may extend around the connection zone 5.2 and such rib would run along inside of the sleeve, preferably at the junction between the sleeve proper and the blade wing section 2.3.

It will be understood that the fiber composite material construction of the sleeve 5 will take into account the individual requirements that must be satisfied by the sleeve with regard to its torque transmitting strength and with regard to its flexibility, or rather, its low bending stiffness. Thus, it might be feasible to make the blade section 5.3, the trailing edge of which is provided with the gap 5.6, out of unidirectionally layered fibers or fiber strands which are primarily oriented in the longitudinal direction of the blade while the sleeve end portions 5.1 and 5.2 are constructed of fiber strands which are wound in the circumferential direction, that is, around the longitudinal axis. Such windings of fibers or fiber strands can continue in the axial direction to form bandages which provide the desired stiffness, including a complete stiffness, so that only the remaining intermediate sleeve section without bandages would remain sufficiently flexible to provide the desired yielding against bending load. Such intermediate section may be as long as or shorter than the sleeve section 5.3.

It has been found, that the gap 5.6 permits a complete inspection of the blade neck section 2.2, especially with the aid of a reflecting, periscope type mirror which permits inspecting all sides of the blade neck section 2.2.

Although the invention has been described with reference to specific example embodiments, it will be appreciated, that it is intended to cover all modifications and equivalents within the scope of the appended claims.

What is claimed is:

1. in a rotor blade for connection to a rotor hub, especially for a rotary wing aircraft, having a radially outer blade wing section, a radially inner blade root section for connection to said rotor hub, and a blade neck section interconnecting said blade wing section and said blade root section in a torsionally yielding manner, the improvement comprising a torsion stiff blade angle control sleeve bridging said blade neck section without contacting said blade neck section for transmitting blade angle adjustment torque moments to said blade wing section, said torsion stiff sleeve having a circumferentially closed radially outer end, first means rigidly connecting said circumferentially closed radially outer end of said torsion stiff sleeve to said blade wing section, said torsion stiff sleeve further having a circumferentially closed radially inner end connectable to blade angle adjustment means for adjusting a blade angle through said torsion stiff sleeve, second means for flexibly connecting said circumferentially closed radially inner end of said torsion stiff sleeve to said blade root section, said torsion stiff sleeve further comprising a leading edge, a trailing edge and a longitudinal inspection gap in said trailing edge, said longitudinal inspection gap extending intermediate said circumferentially closed radially inner and outer ends of said torsion stiff sleeve for visually inspecting said torsionally yielding blade neck section through said inspection gap, said torsion stiff sleeve having a reinforced upper longitudinal edge and a reinforced lower longitudinal edge along said inspection gap for compensating any loss in torsion stiffness of said torsion stiff sleeve due to said inspection gap, whereby said torsion stiff sleeve permits a proper blade angle adjustment and also a visual inspection of said blade neck section.

2. The rotor blade of claim 1, wherein said torsion stiff sleeve is made of fiber-reinforced synthetic material having a fiber orientation of ±45° relative to a radially extending longitudinal blade axis, said upper and lower reinforced longitudinal edges of said inspection gap comprising fiber strands extending unidirectionally substantially in parallel to said longitudinal blade axis.

3. The rotor blade of claim 2, wherein said reinforced edges face each other across the gap.

4. The rotor blade of claim 1, made of fiber-reinforced synthetic material, wherein said torsion stiff sleeve is also made of fiber-reinforced synthetic material such that said torsion stiff sleeve merges integrally into said blade wing section for forming a single piece fiber-reinforced synthetic material body including said blade wing section and said torsion stiff sleeve.

5. The rotor blade of claim 1, made at least partially of fiber-reinforced synthetic material so that said blade wing section has at least a skin of fiber-reinforced synthetic material, wherein said torsion stiff sleeve is also made of fiber-reinforced synthetic material such that said torsion stiff sleeve merges integrally into the skin of said blade wing section for forming a single piece fiber-reinforced synthetic material body including said skin and said torsion stiff sleeve.

* * * * *